(12) United States Patent
Stensen

(10) Patent No.: US 8,011,390 B2
(45) Date of Patent: Sep. 6, 2011

(54) REGULATING DEVICE AND METHODS OF USING SAME

(76) Inventor: Alf Egil Stensen, Stavanger (NO)

( * ) Notice: Subject to any disclaimer, the term of this patent is extended or adjusted under 35 U.S.C. 154(b) by 192 days.

(21) Appl. No.: 12/305,923

(22) PCT Filed: Jun. 11, 2007

(86) PCT No.: PCT/NO2007/000200
§ 371 (c)(1),
(2), (4) Date: Jan. 28, 2009

(87) PCT Pub. No.: WO2007/148978
PCT Pub. Date: Dec. 27, 2007

(65) Prior Publication Data
US 2009/0314371 A1 Dec. 24, 2009
US 2010/0175769 A2 Jul. 15, 2010

(30) Foreign Application Priority Data
Jun. 19, 2006 (NO) .................................. 20062855

(51) Int. Cl.
*G05D 7/01* (2006.01)
(52) U.S. Cl. ................. 138/43; 138/45; 138/46
(58) Field of Classification Search ........... 138/43, 138/45, 46; 251/11, 903, 321, 323, 337
See application file for complete search history.

(56) References Cited

U.S. PATENT DOCUMENTS

| | | | |
|---|---|---|---|
| 1,813,122 A * | 7/1931 | Moore | 184/7.3 |
| 1,833,340 A * | 11/1931 | Smith et al. | 196/110 |
| 2,508,788 A * | 5/1950 | Hallinan | 239/75 |
| 2,859,768 A * | 11/1958 | Teague, Jr. | 137/468 |
| 3,054,426 A * | 9/1962 | Fritz et al. | 138/46 |
| 3,084,865 A * | 4/1963 | Fleer et al. | 236/99 R |
| 3,211,414 A * | 10/1965 | Webb | 251/11 |
| 3,340,899 A * | 9/1967 | Welty et al. | 138/43 |
| 3,456,722 A | 7/1969 | Cornelius | |
| 3,464,227 A * | 9/1969 | Matthies | 62/225 |
| 3,650,505 A * | 3/1972 | Drexel | 251/11 |
| 3,967,781 A * | 7/1976 | Kunz | 236/68 R |
| 4,096,993 A * | 6/1978 | Behr | 236/68 B |

(Continued)

FOREIGN PATENT DOCUMENTS

CA 2502654 2/2004

(Continued)

*Primary Examiner* — James F Hook
(74) *Attorney, Agent, or Firm* — Patterson & Sheridan, L.L.P.

(57) ABSTRACT

The present invention relates to a regulating device (1) for regulating a fluid flow, the regulating device (1) comprising an actuator element (3) which is provided with a flow area (4) arranged to convey fluid between a fluid inlet (9) and a fluid outlet (13) and which includes a first restriction device (17), and a regulating device body (5) which is disposed at least in a portion of the flow area (4) and which is provided with a second restriction device (19) forming, together with said first restriction device (17), the restriction unit or choke device (17, 19) of the regulating device (1), the actuator element (3) and regulating device body (5) being arranged to move freely independently of each other as a consequence of a material expansion or material contraction, the throughput of the choke device (17, 19) being influenced by an energy source (21) which is arranged to supply energy to at least one of the actuator element (3) and/or regulating device body (5). Also described are methods of using the regulating device (1). The regulating device (1) is also suitable for use as a flow meter.

4 Claims, 4 Drawing Sheets

U.S. PATENT DOCUMENTS

| | | | |
|---|---|---|---|
| 4,209,065 A | 6/1980 | Ledent | |
| 4,243,202 A * | 1/1981 | Inamura | 251/61.4 |
| 4,867,198 A * | 9/1989 | Faust | 137/503 |
| 5,199,497 A | 4/1993 | Ross | |
| 5,865,418 A | 2/1999 | Nakayama et al. | |
| 6,216,782 B1 * | 4/2001 | Skinner | 166/250.01 |
| 6,478,090 B2 | 11/2002 | Deaton | |
| 6,745,090 B1 | 6/2004 | Malizia, Jr. | |
| 6,745,838 B2 | 6/2004 | Watson | |
| 7,032,675 B2 | 4/2006 | Steele et al. | |
| 2009/0314371 A1 * | 12/2009 | Stensen | 138/46 |

FOREIGN PATENT DOCUMENTS

| | | |
|---|---|---|
| EP | 0841510 | 5/1998 |
| GB | 2387891 | 10/2003 |

* cited by examiner

REGULATING DEVICE AND METHODS OF USING SAME

The present invention relates to a regulating device for use in the regulation of a fluid flow. More particularly, it relates to a regulating device which is operated by material expansion through a controlled change in the energy potential of said material, for example thermal energy, and which is arranged to regulate a substantially constant amount of a desired fluid independently of the pressure, viscosity and temperature of the fluid at the inlet portion of the regulating device. The invention also relates to methods of using the regulating device. In addition, the invention relates to a flow gauge or quantity gauge, said regulating device being incorporated therein. In this document the term flow gauge should also be understood as possibly being a quantity gauge.

The object of the invention is to provide a regulating device which is substantially free of mechanically movable parts, while, at the same time, it is adjustable and not easily influenced by possible impurities in the form of particles in the fluid flowing through the regulating device. A further object is to provide a regulating device, which could be utilized as a flow gauge or quantity gauge.

In the petroleum production industry, for example, there is an ever-increasing need for the ability to dose a fluid, such as a liquid chemical, into another medium, a so-called chemical injection. Further, there are an expressed wish and need for the ability to automate and remote control the chemical injection systems. Today there are systems commercially available, and also systems known from the patent literature, describing the dosing of fluids into, for example, hydrocarbon wells by the use of different control valves, such as damper, choke, needle and gate control valves, also of thermally sensitive and self-adjusting control valves. Examples of such systems are disclosed in the Canadian patent application CA 2 483 399, American U.S. Pat. No. 6,745,838, U.S. Pat. No. 4,565,215, PCT applications WO 97/34116, WO 2004/016904 and WO 94/25188, European patent application EP 1 355 169 and British patent application UK 2 276 675. However, it turns out that all the control valves shown in the above-mentioned publications, and systems, which are commercially available, is have at least one of the drawbacks mentioned in what follows.

In the automation and remote control of, for example, chemical injection there is a need for an actuator, which is arranged to regulate the amount of fluid, which is injected into a fluid flow. It is normal that such actuators are constituted by one or more electric, hydraulic or pneumatic motors which is/are connected to a control valve. This represents drawbacks related both to the space requirement and to repair and maintenance, which will necessarily have to be carried out on mechanically movable parts over time. To have control over the amount of fluid injected, there is additionally the need for a flow gauge or a so-called "flow meter" which needs to be connected to a portion of the conduit in which the injection fluid is conveyed. Such a flow meter is relatively space demanding, introduces many complex and maintenance-demanding parts and represents a considerable drawback both in the investment phase and in the operation phase.

A substantial proportion of the dosing systems used in the injection of chemicals are sensitive to the viscosity of the chemicals, which is, in turn, influenced by temperature, so that the viscosity increases when the temperature falls. To avoid too high a viscosity, there may therefore be the need to provide the supply system of the chemicals with heat and/or insulation, which represents in turn economic and operational drawbacks.

A number of the known regulating systems have turned out to be sensitive to impurities because of narrow flow areas, for example in the so-called "orifice". Therefore, to avoid impurities, there is a need for a filter system retaining impurities. Such filter systems require servicing in the form of relatively frequent replacement of filters. This represents a particularly great disadvantage where the access to the filter system is difficult or limited.

The invention has for its object to remedy or at least reduce one or more drawbacks of the prior art.

The object is achieved through features specified in the description below and in the claims that follow.

In a first aspect the present invention is constituted by a regulating device for regulating a fluid flow, the regulating device comprising an actuator element including a first restriction device, and a regulating device body including a second restriction device and forming, together with said first restriction device, the choke device of the regulating device, the regulating device being provided with a flow area arranged to convey fluid between a fluid inlet and a fluid outlet, and the actuator element or regulating device body being disposed at least in a portion of the regulating device body and actuator element, respectively, wherein the actuator element and regulating device body are connected in such a way that the actuator element and the regulating device body are arranged to move freely independently of each other in consequence of a material expansion or material contraction, the through-put of the choke device being indirectly influenced by an energy source which is arranged to supply energy to at least one of the actuator element and/or regulating device body.

By increased energy potential is meant, in this document, increased electron migration or energy inducing material expansion.

In a preferred embodiment the energy supplied is provided by an energy source in which the energy supplied is arranged to be controlled. The energy, which is supplied to the actuator element from the energy source, could thereby be varied, so is that the restriction devices of the choke device could selectively change position relative to each other, whereby the flow rate of the regulating device could be changed.

In one embodiment the regulating device is provided with an energy-insulating means preventing, to the greatest degree possible, energy supplied to the material from being transmitted to the environment surrounding the regulating device. This is important in order for the regulating device to be influenced, to the smallest degree possible, by the energy, for example the temperature, of the surrounding environment, and particularly important in a second aspect of the invention, in which the regulating device according to the present invention is used as a flow meter or quantity gauge for measuring the flow rate or quantity of a fluid.

Such a flow meter for measuring the flow rate or quantity, is characterized by including a regulating device according to the first aspect of the invention wherein the flow rate being given by the formula:

$Gs = I/(Cp*(t2-t1))$, in which

Gs is the flow rate of the fluid [g/s];
I is the supplied power [W], wherein $I \neq 0$;
Cp is the thermal capacity of the fluid [J/g °K.];
t1 is the energy of the fluid measured at an inlet portion of the regulating device (1); and
t2 is the energy of the fluid measured at an outlet portion of the regulating device (1), the self-adjusting action of the flow meter (1) causing the energy difference t2–t1 to be constant at a constant supplied power I.

With constant energy difference is meant an energy difference varying to such a small degree that it has no practical consequence for the purpose.

To be able to calculate the flow rate even before energy balance has been reached, the flow meter is further, in one embodiment, provided with a measuring device to measure a change in the energy potential, for example temperature, of a fluid in consequence of energy supplied to the fluid through the entire regulating device or parts thereof.

In a third aspect of the invention there is provided a method of regulating a fluid flowing through a regulating device according to the first aspect of the invention, wherein the fluid flow through the regulating device is regulated by changing the energy supply to the energy source so that the throughput of the choke device will change until a new energy balance has been achieved, so that that the energy supplied to the regulating device from the energy source corresponds to the energy removed from the regulating device via the fluid flowing through.

In a fourth aspect of the invention there is provided a method of regulating an energy of a fluid which is flowing through a regulating device according to the first aspect of the invention, wherein the energy of the fluid flowing through the regulating device is regulated by changing the energy supply from the energy source to the regulating device so that the throughput of the choke device is changed until the fluid flowing out of the regulating device has obtained the desired energy.

A connection between supplied energy, flow rate and the energy potential and properties of a fluid can, somewhat simplified, be expressed as follows:

$$I = Gs*Cp+(t2-t1) \quad [1]$$

or:

$$t2 = t1+I/(Gs*Cp) \quad [1']$$

in which:
I is the power supplied [W] (j/s). This is a known quantity as the power supplied is controlled;
Gs is the flow rate of the fluid [g/s];
Cp is the thermal capacity of the fluid [j/gK]. This is a known, or at least a measurable, quantity for a fluid;
t1 is the energy potential, for example temperature, of the fluid measured at the inlet portion of the fluid; and
t2 is the energy potential, for example temperature, of the fluid measured after it has flowed through the entire regulating device or parts thereof.

The flow rate Gs or mass flow through the regulating device, converted into kg/h is thereby given from the following formula:

$$Gs = 3.6*I/Cp*(t2-t1)[kg/h] \quad [2]$$

To the formula [2] could be added a "calibration factor" Kf which could be determined through trials or be deduced mathematically, so that the formula [2] will be as follows:

$$Gs = Kf*3.6*I/Cp*(t2-t1)[kg/h] \quad [3]$$

The calibration factor Kf may be a constant or a mathematical expression.

The regulating device could also be controlled actively and/or work as a flow meter or quantity gauge based on the following connection $$Q = v*(\pi*Di^2)/4 \quad [4]$$

in which:

$$v = \left( \frac{1.86*c*\pi*Di*SL1*(T1-(0.5*T3+0.5*T2))}{(c*\mu/k)^{2/3}*(SL1/Di)^{1/3}*I*(\mu w/\mu b)^{0.14}} \right) *\mu^{K2}*(1/Di)^{K3}*1/3600000 Sg*K^{Ke}$$

Q: Volumetric flow rate (1/h)
v: Flow rate (m/s)
Variable Sensor/Measurement Parameters:
T1: Temperature of actuator element
T2: Temperature of fluid in
T3: Temperature of fluid out upstream of choke device
I: Power supplied (W)
Process Input Parameters:
Sg: Specific weight of the medium (kg/l)
μ: Viscosity of the medium at 15° C. (CP)
μb: Viscosity of the medium (CP) at "fluid bulk temperature"
c: Thermal capacity of the medium (kJ/Kg ° C.)
k: Thermal conductivity of the medium (w/m ° C.)
Design Input Parameters:
Di: Internal diameter of actuator element flow bore (m)
SL1: Length of actuator element bore exposed to fluid (m)
K1, K2, K3: test constants
Process Calibration Parameters:
K: Calibration factor
Ke: Calibration factor exponent
Kv: Viscosity profile factor
System Calibration Parameters:
Tm: Numeric value (time in seconds for how long the control system should be in the measuring mode). Ability to change time needed to optimize during testing.
Tr: Numeric value (time in seconds for how long the control system should be in the regulating mode). Ability to change time needed to optimize during testing.

In addition, necessary changes in values for PID functions are possible.
Calculated Process Parameters:
μw: Viscosity of the medium (CP) at the surface temperature T1 of the actuator element.
μw=μ+(μ*kv (15−T1))
μm: Viscosity of the medium (CP) at mean temperature Tm=(0.5T3+0.5T2)
μm μ+(μ*kv (15−Tm))
Input Operation Parameters:
Qi: Set value for desired flow rate (l/h)
Regulating Function:

The control system is to regulate and maintain a stable flow rate Q compared to the set value for desired flow rate Qi through regulation of the power supplied to the regulating device. There may also be a need for PID regulation of the power to balance deviations registered between Q and Qi.

The control system must sequentially switch between the measuring mode and the regulating mode.

Measuring mode: measuring in Tm seconds the power supplied without the use of a regulating function, the measured power supplied then representing the power I, ref. "Variable sensor/measurement parameters" above.

I gives, via a set of mathematical formulas for v and Q, the relevant measured flow rate or quantity Q, which is compared, in turn, to the set value for flow rate or quantity Qi.

Regulating mode: regulating in Tr seconds the supplied power to balance deviations registered between the last registered Q and input value Qi.

T1 must or may be used as the reference control parameter and the system stays in the regulating mode until T1 is stable, to switch then into the measuring mode and find the new current Q etc. The measuring mode and regulating mode are run in a continuous sequence Tm, Tr (or until T1 is stable) to obtain Q=Qi.

In what follows is described a non-limiting exemplary embodiment of a preferred embodiment which is visualized in the present drawings, in which.

Figure 1:
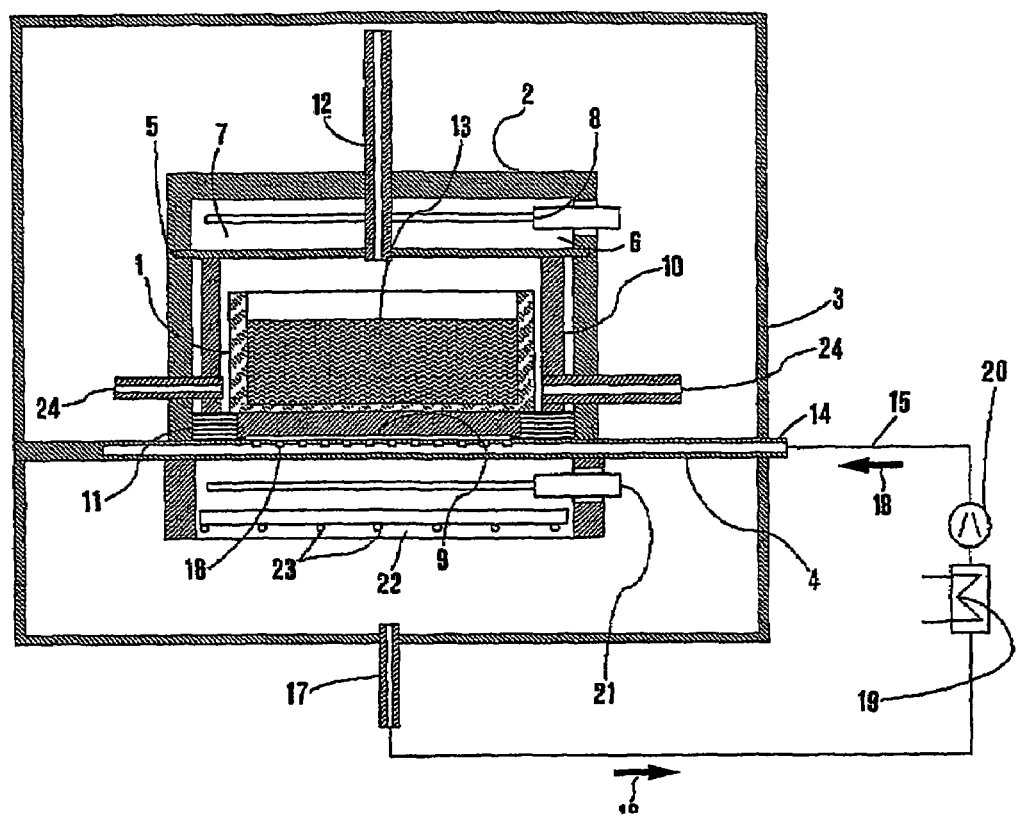
FIG. 1 shows a view of a regulating device according to the present invention, which is provided with an external energy source in the form of a heating element formed by a heating cable evenly distributed along a portion of the external jacket surface of the regulating device.
Figure 2:
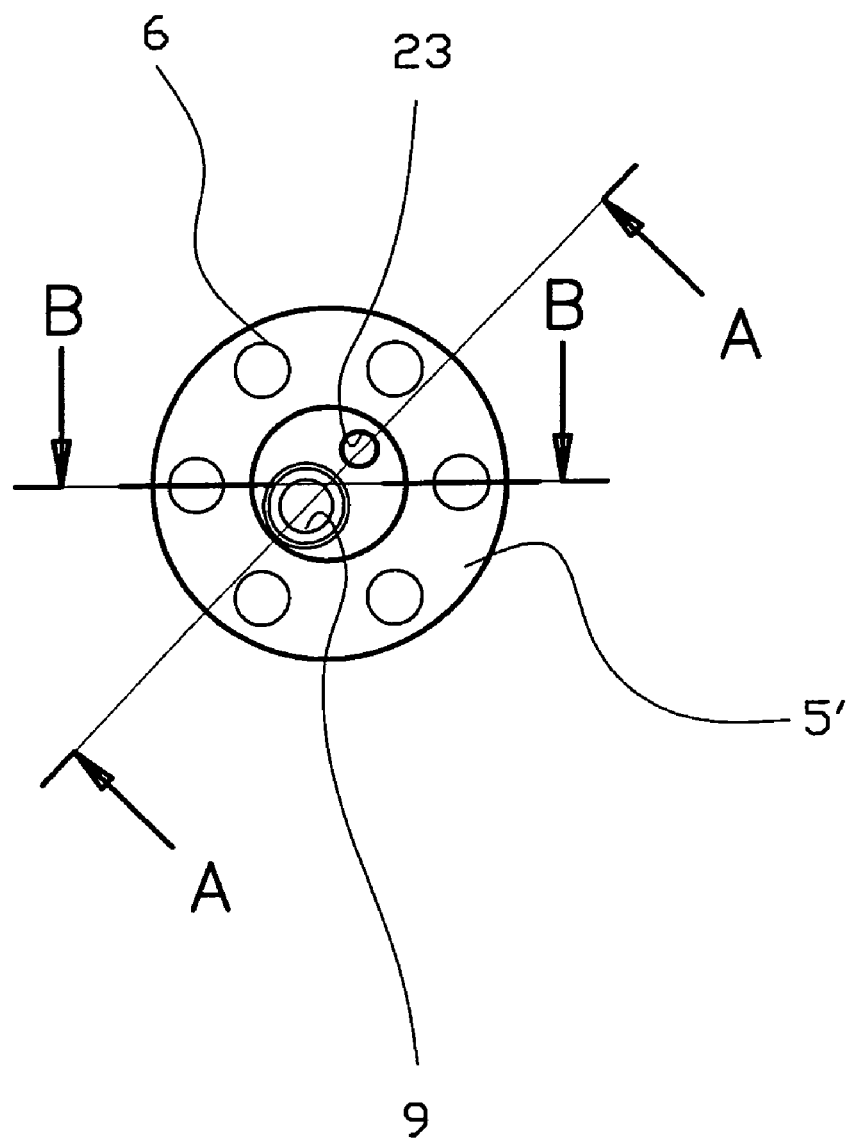
FIG. 2 shows a view of the regulating device shown in FIG. 1, viewed from a first end portion of the regulating device.

In the drawings the reference numeral 1 indicates a regulating device, which includes an actuator element 3 and a regulating device body 5. At its first end portion 7, the regulating device 1 is provided with a fluid inlet 9, and at its second end portion with a fluid outlet 13.

Figure 3:
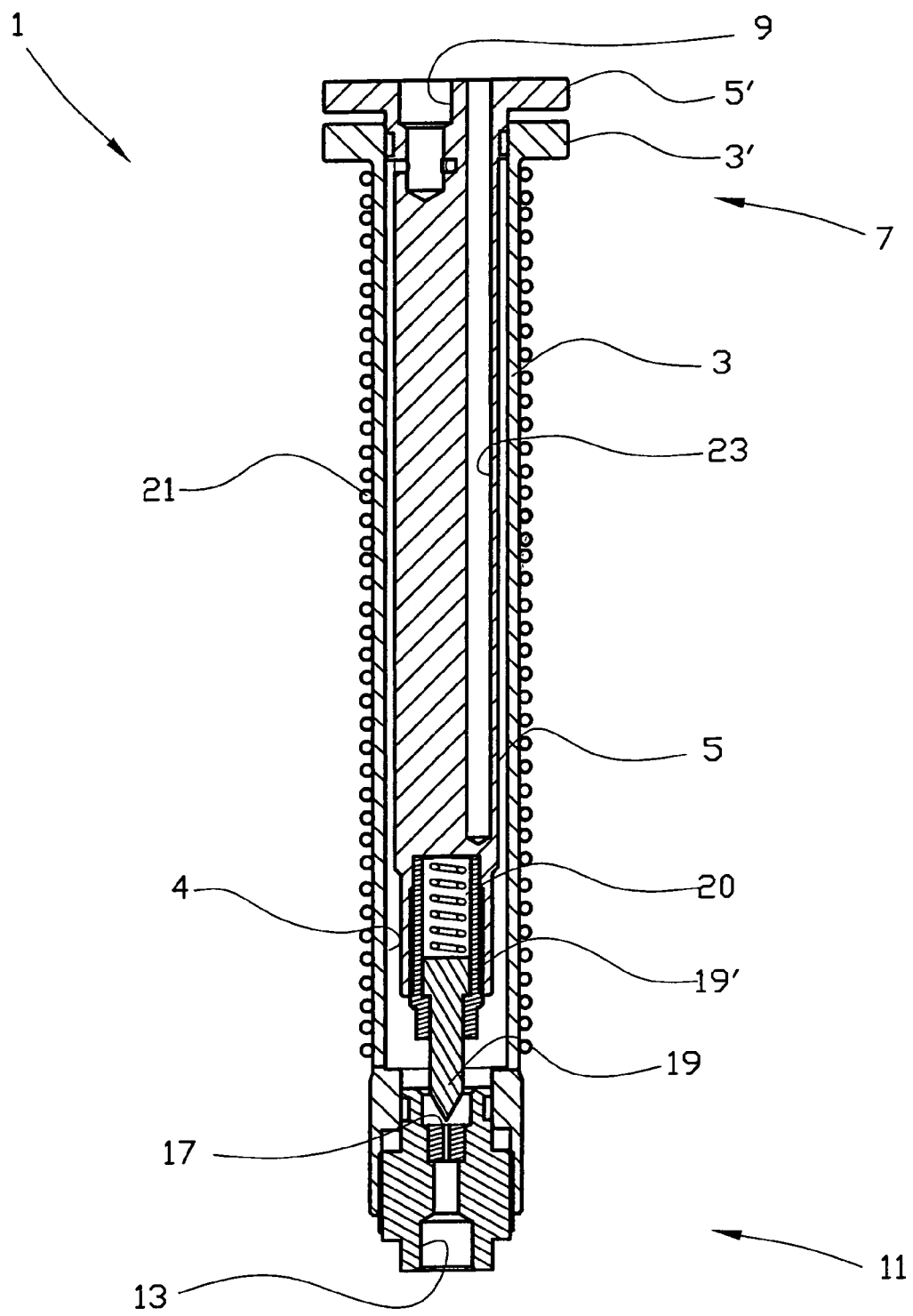
FIG. 3 shows a cross-section of the regulating device viewed through the line A-A of FIG. 2.
Figure 4:
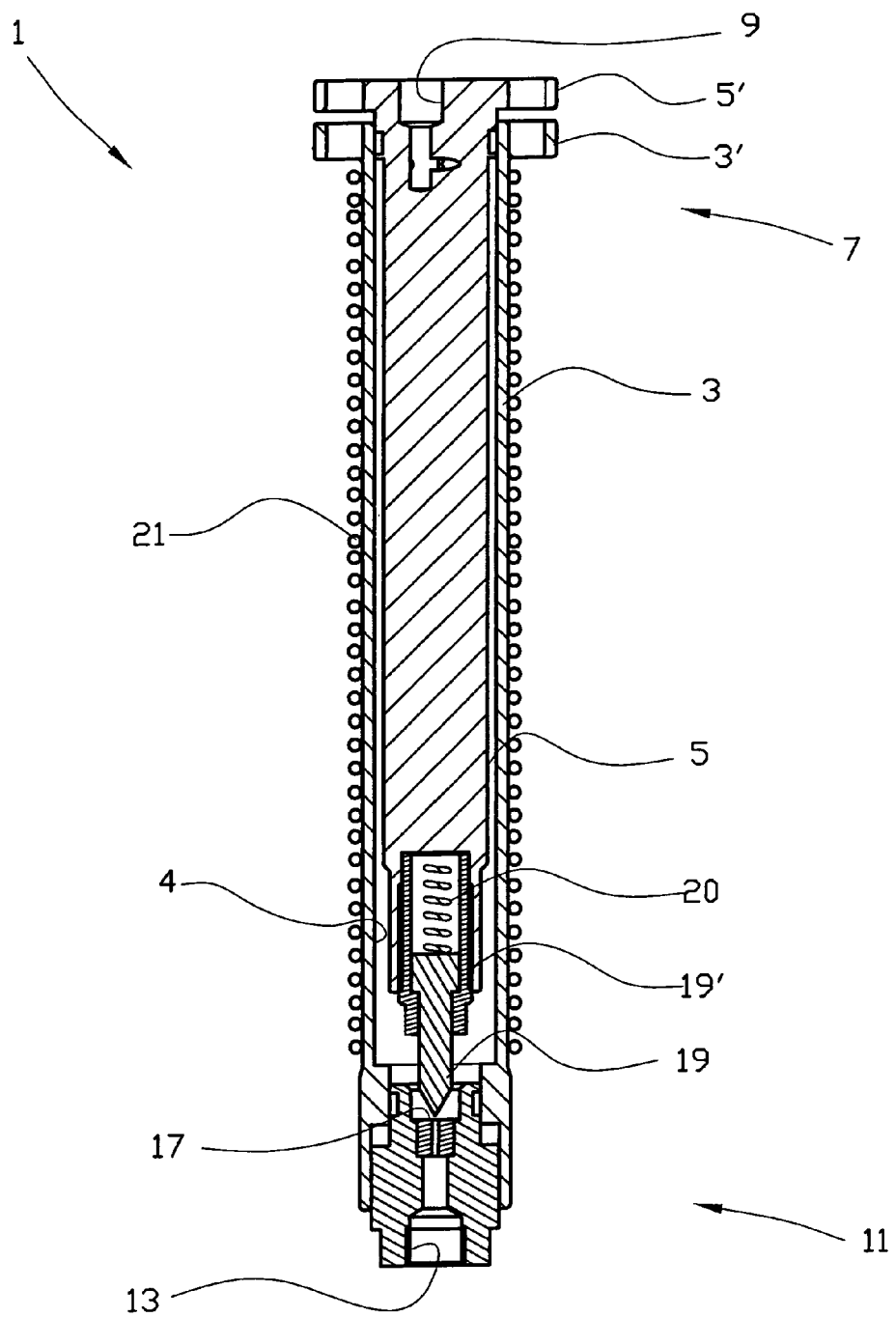
FIG. 4 shows a cross-section of the regulating device viewed through the line B-B of FIG. 2.

The fluid inlet 9 and fluid outlet 13 are in fluid communication with an annulus 4 which is defined by a portion of the actuator element 3 and regulating device body 5, see FIG. 3.

The actuator element 3 is provided, at the first end portion 7 of the regulating device 1, with a flange 3' which is connected, by means of screws 6 (see FIG. 1) or a fixed connection, to a flange 5', the flange 5' forming an end portion of the regulating device body 5. Even though the screws 6 are shown only in FIG. 1, it is to be understood that the screws, or a fixed connection, are/is also necessary in the other figures.

A regulating device seat 17 is fixed to a second end portion 11 of the actuator element 3. In the second end portion 11 a regulating device needle 19 is also placed in the end portion of the regulating device body 5. Thus, the regulating device seat 17 and the regulating device needle 19 form the choke device or restriction of the regulating device.

The regulating device needle 19 is disposed in a regulating device needle housing 19', which also has the effect of guiding the regulating device needle 19. The regulating device needle 19 is biased in a manner known per se into abutment on a portion of the regulating device needle housing 192 by means of a spring 20.

An energy source in the form of a heating element 21 is disposed on the outside of the jacket surface of the actuator element 3. The heating element 21 is preferably an electric heating element, but a skilled person will understand that energy could be supplied by means of other means. Even though it is not shown specifically in the drawings a skilled person will also understand that the heating element 21 must be connected to an energy source, not shown, for example via wires, is not shown. Further, it will be understood that heating elements other than a cable could be utilized. For example, a heating foil known per se will be well suited.

When the actuator element 3 is supplied with energy by means of the heating element 21, the energy potential of the actuator element 3 will increase and the actuator element 3 will expand as a function of the coefficient of expansion of the material or materials from which the actuator element 3 is made. For the present described but non-limiting embodiment of the invention it is the expansion of the actuator element 3 in the axial direction, which affects the throughput of the choke device 17, 19, as heating of the actuator element 3 will result in it being lengthened relative to the regulating device body 5.

When fluid, for example a liquid, at a temperature lower than that of the heated actuator element 3, is flowing through the regulating device 1, the liquid will cool the actuator element. There will then be a thermal loss by the liquid being heated and leaving the regulating device 1 at a higher temperature than it had upstream of the fluid inlet 9 of the regulating device 1.

If too much liquid is flowing through the regulation device 1, the actuator element 3 is cooled so that it retracts, whereby the flow through the choke device 17, 19 of the regulating device 1 is shut off more and more. The reduced opening of the choke device 17, 19 will result in less throughput of liquid. Thereby the thermal loss or the heat transport is reduced and the movement of the actuator element 3 relative to the regulating device body 5 will cease when the energy, which is transported away with the fluid, substantially equals the energy supplied to the heating element 21. Thus, energy balance will be achieved between the heat supplied and is the heat transported away.

If too little fluid, for example liquid, is flowing through the regulating device 1 relative to the energy transmitted to the actuator element 3 from the heating element 21, the temperature of the actuator will rise, so that the choke device 17, 19 of the regulating device 1 will open more and more. Thereby the fluid flow and energy loss will increase, and the actuator element 3 will again find a balancing point, at which the energy, which is transported away with the fluid, substantially equals the energy, which is supplied to the heating element 21. Again, energy balance has been achieved between the heat supplied and heat transported away.

From the above it will be understood that the fluid flow could be regulated by regulating the energy supplied to the heating element 21.

A person skilled in the art will understand that the regulating device 1 will not be influenced to any substantial degree by the viscosity of the fluid or the pressure of the fluid upstream of the regulating device 1, as the choke device 17, 19 of the regulating device 1 will adjust towards energy balance, at which the energy supplied from the heating element 21 corresponds to the energy which is being transported away with the fluid flowing through the regulating device 1.

The choke device or restriction 17, 19 of the regulating device 1 is provided without the use of a so-called orifice. This has the effect of the regulating device 1 not being easily influenced by contaminating particles. If a particle is retained between the regulating device needle 19 and the regulating device seat 17, the fluid throughput will be reduced. Thereby the actuator element 3 will heat up in consequence of the energy supplied to the regulating device 1 from is the heating element 21 being greater than the energy trans-ported away from the regulating device 1 with the fluid. Consequently, the distance between the regulating device needle 19 and the regulating device seat 17 will increaser and the particle retained will be released from the choke device 17, 19.

The regulating device seat 17 is arranged to be adjustable relative to the regulating device needle 19. Such a possibility of adjustment (not specifically shown) is achieved for example by the regulating device seat 17 having a threaded connection to the lower portion of the actuator element 3. Alternatively, or additionally, the extent of the regulating device needle 19 in the longitudinal direction could be adjusted. Such a possibility of adjusting the choke device 17, 19 provides a possibility of changing the operative range of the regulating device.

To be able to, among other things, calculate the fluid flow before energy balance has been achieved, the regulating device is provided with first and second measuring devices (not shown) of a kind known per se for measuring the energy potential, such as temperature. Said first measuring device, measuring the energy potential t1, is disposed at the inlet portion 9 of the fluid. Said second measuring device, measuring the energy potential t2, is disposed at the bottom of a blind bore 23 (see FIG. 3) formed in a portion of the regulating device body 5. The blind bore 23 extends from the first end portion 7 of the regulating device body to a portion near the regulating device needle 19. The measuring devices not shown are arranged to transmit the measuring results t1 and t2, in a manner known per se, for example to a computer not shown, which could calculate the flow rate according to formula (s) [3] and/or [4] above. Alternatively, the energy potential, is for example the temperature, of the exiting fluid could be regulated on the basis of formula [1'] above.

Thus, the regulating device 1 according to the present invention provides a regulating device which is substantially free of mechanically movable parts while, at the same time, being self-adjusting and adjustable, the regulating device not being easily influenced by possible impurities in the form of particles in the fluid conveyed through the regulating device. A further advantage of the regulating device 1 is that it could be used as a flow meter or quantity gauge.

The invention claimed is:

1. A flow meter for measuring a flow rate of a fluid, the flow meter comprising:

a regulating device comprising an actuator element including a first restriction device, and a regulating device body including a second restriction device and forming, together with said first restriction device, the choke device of the regulating device, the regulating device being provided with a flow area arranged to convey fluid between a fluid inlet and a fluid outlet, and the actuator element or regulating device body being disposed at least in a portion of the regulating device body and actuator element, respectively, characterized in that the actuator element and regulating device body are connected in such a way that the actuator element and the regulating device body are arranged to move freely independently of each other in consequence of a material expansion or material contraction, the through-put of the choke device being indirectly influenced by an energy source which is arranged to supply energy to at least one of the actuator element and/or regulating device body, wherein the flow rate being given by the formula:

$Gs = I/(Cp*(t2-t1))$, in which

Gs is the flow rate of the fluid [g/s];
I is the supplied power [W], wherein I≠0;
Cp is the thermal capacity of the fluid [J/g °K];
t1 is the energy of the fluid measured at an inlet portion of the regulating device; and
t2 is the energy of the fluid measured at an outlet portion of the regulating device, the self-adjusting action of the flow meter causing the energy difference t2−t1 to be constant at a constant supplied power I.

2. The flow meter according to claim 1, wherein the energy source is arranged to be controlled.

3. The flow meter according to claim 1, wherein the operating range of the choke device is adjustable.

4. The flow meter according to claim 1, wherein the flow meter is further provided with a measuring device for measuring temperature and temperature change in consequence of energy supplied to the fluid through the entire regulating device or parts thereof.

* * * * *